United States Patent [19]

Kaminski et al.

[11] Patent Number: 4,841,820

[45] Date of Patent: Jun. 27, 1989

[54] METHOD OF DESIGNING A TURN BROACH

[75] Inventors: Brian D. Kaminski; Pulak Bandyopadhyay, both of Rochester Hills, Mich.

[73] Assignee: General Motors Corporation, Detroit, Mich.

[21] Appl. No.: 239,806

[22] Filed: Sep. 2, 1988

Related U.S. Application Data

[63] Continuation-in-part of Ser. No. 37,660, Apr. 13, 1987, Pat. No. 4,784,534.

[51] Int. Cl.$^4$ .................. B23B 1/00; B23B 5/18; B23D 43/02
[52] U.S. Cl. .................................. 82/1.11; 82/106; 407/19; 409/244; 409/263
[58] Field of Search ............ 29/6; 76/101 R; 82/1 C, 82/9; 407/12, 13, 15, 18, 19; 409/244, 247, 263, 281

[56] References Cited

U.S. PATENT DOCUMENTS

| | | | |
|---|---|---|---|
| 1,089,376 | 3/1914 | Hanson | 407/13 |
| 1,126,107 | 3/1913 | Simmons | 407/53 |
| 1,899,608 | 2/1933 | Bullard | 407/13 |
| 2,123,777 | 4/1935 | Hart | 29/566 |
| 2,645,980 | 7/1953 | Bedker | 407/15 |
| 3,967,515 | 7/1976 | Nachtigal et al. | 82/2 B |
| 4,189,267 | 2/1980 | Deprez | 409/59 |
| 4,212,573 | 7/1980 | Fields | 409/251 |
| 4,243,347 | 1/1981 | Clapp et al. | 407/15 |
| 4,274,766 | 6/1981 | Raupp, Jr. et al. | 407/15 |

FOREIGN PATENT DOCUMENTS

| | | | |
|---|---|---|---|
| 547301 | 7/1975 | U.S.S.R. | 407/13 |
| 233609 | 1/1927 | United Kingdom | 407/19 |

OTHER PUBLICATIONS

Handbook of High Speed Machining Technology Chapman & Hall 1985, pp. 151–152.
Tool and Manufacturing Engineers Handbook SME, vol. 1, Chapter 7, p. 14, Drozda et al., 1983.

*Primary Examiner*—Frederick R. Schmidt
*Assistant Examiner*—William E. Terrell
*Attorney, Agent, or Firm*—Patrick M. Griffin

[57] ABSTRACT

An improved cutting tooth configuration in which, unlike the conventional, straight line tool pattern with its constant tool rise, each tooth is incrementally advanced relative to the prior tooth by an amount that progressively decreases. This accounts for the variations in reaction force on the cutting teeth caused by workpiece deflections, so that the net thickness of material removed by each cutting tooth remains relatively constant. Instability and variation in the cutting force is thereby avoided, and tool wear is decreased.

2 Claims, 6 Drawing Sheets

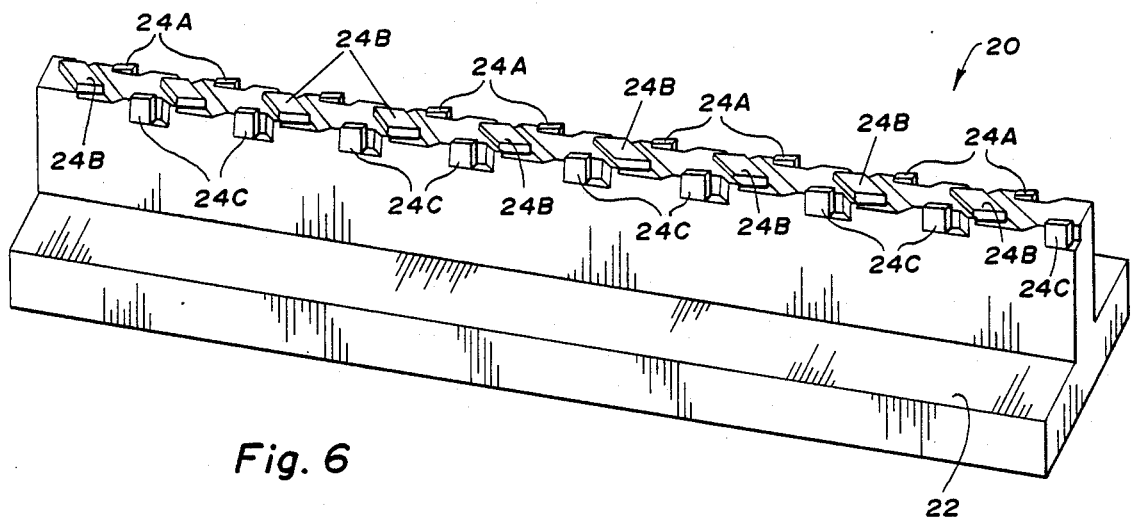
Fig. 6
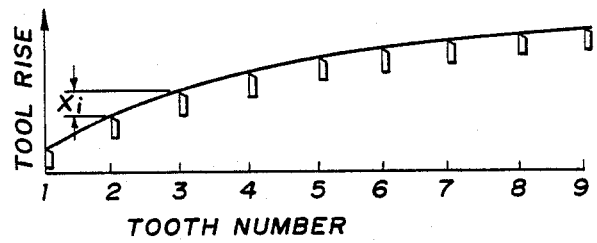
Fig. 7
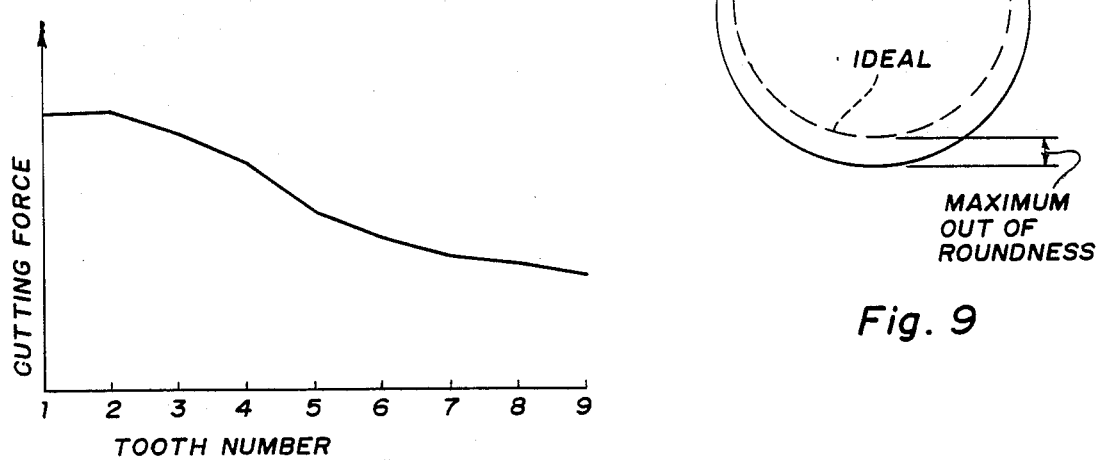
Fig. 8
Fig. 9

METHOD OF DESIGNING A TURN BROACH

This application is a continuation-in-part of application SN 037,660 filed April 13, 1987 Pat. No. 4,784,534.

This invention relates to metal machining in general, and specifically to an improved method of designing and using a turn broach, a method that gives reduced tooth wear and improved tool life.

BACKGROUND OF THE INVENTION

Rough cast metal workpieces, such as crankshaft castings, must be machined down from their initially rough surface to produce smooth, accurately dimensioned surfaces, such as the bearing main journals. One common machining method used is known as plunge turning, in which a single cutting tool is pushed, or "plunged", into the rough surface as the workpiece is rapidly rotated about its axis, removing the excess surface material in one continuous layer. A different method finding increasing acceptance is the so called turn broaching method. Turn broaching is so called because the cutting tool used is a broach, rather than a single tool, and has a series of cutting teeth. The turn broach is moved relative to the rapidly rotating workpiece in such a way that the cutting teeth are incrementally advanced toward and into the rough surface, with the excess material being removed in progressive layers. While turn broaching has proved successful in producing surfaces of the desired quality, and has often been proved more economical than plunge turning, tool life and productivity have still not been as great as had been initially hoped.

A typical turn broaching station is illustrated in FIG. 1. A suitable power source 10 rotates a crankshaft rough casting 12 while a turn broach 14 is advanced along a straight path perpendicular to the axis of rotation. This incrementally advances a series of cutting teeth 16 into the rough outer surface of the casting 12. Excess material is thus progressively nibbled away by the advancing teeth 16. A typical turn broach 14, as shown in FIG. 2, generally consists of a cutter body 18 upon which the teeth 16 are removably mounted, so that they may be easily sharpened, or replace, with wear or breakage. Often, the cutting teeth will be divided up into various discrete sections or groupings, a "bumper" section that sees the workpiece surface first and is designed to remove casting scale, a "rougher" section that sees the workpiece next and removes the bulk of the metal, and a final "finisher" section that brings the machined surface within final specification. The prior art turn broach 14 does not include a bumper or finisher as such, but corresponds to a typical rougher section. Breakage and tool life problems, not surprisingly, are noticed most frequently in the rougher sections, where most of the metal is removed. Prior art turn broaches typically have cutting teeth that are arranged linearly, that is, each tooth is incrementally advanced a uniform amount higher than the ust prior tooth, with the sum of all tooth increments equaling the total thickness of metal that it is desired to remove. This incremental advance, at least in the straight line type of turn broach shown in FIG. 2, is often referred to as the tool rise. To give a specific example, if a ten millimeter total thickness of excess workpiece metal must be removed, and there are ten teeth, then the first tooth is set to take a one millimeter initial depth of cut, and each of the next nine teeth is set one millimeter higher than the prior tooth, so as to machine a one millimeter thick layer each, at least in theory. Thus, the conventional tool rise takes into account only the total thickness of material to be removed, and just divides it up evenly over all the teeth.

A turn broach need not have the teeth arranged in a straight line as such, as in FIG. 2. For example, the cutter body could be arcuate in shape, with the teeth arranged equally angularly spaced in a spiral about an axis of the cutter body. The incremental advance of each tooth, then, is not a tool rise as in the FIG. 2 broach, but is instead a progressively greater radius, measured relative to the cutter body axis. The arcuate turn broach is operated with its axis parallel to the axis of the rotating workpiece, and is then turned about its axis, rather than being advanced in a straight line. The effect is the same, however, which is that the teeth are incrementally advanced into the workpiece surface to progressively machine it down. The basic tooth configuration for the arcuate broach is also the same as the straight line broach. That is, the incremental advance in radius from tooth to tooth is still linear and uniform, and is calculated only on the basis of the total thickness of metal to be removed divided over the number of teeth.

The conventional uniform or linear tool rise described above is usually referred to in prior art references in general terms as a "progressive" tooth rise. This conventional cutting tooth configuration has apparently been used almost universally, without questioning its efficiency. The prior art has recognized that as a tool cuts, there are deflections induced in the workpiece, which deflections can cause the workpiece to oscillate and bounce, adversely affecting surface quality. Known attempts in the prior art to deal with this deflection problem, however, have not been satisfactory and have not, so far as is known, involved any significant alteration of the conventional tool rise pattern. For example, the U.S. Pat. No. 2,645,980 to Bedker discloses a broach in which the turning workpiece is trapped and confined between two sections of a fork like broach, with one section located on either side of the part. The tool is pivoted so that it can ride with the oscillating workpiece, and a spring is provided, apparently to absorb the oscillations. Such a structure is just not practical for production for several reasons, including the greatly increased friction that would result from attempting to trap a rapidly spinning turning part, and because of the extra room required above the part for the extra broach section. Fundamentally, such a design does nothing to deal with the deflections and oscillations, it merely tries to tolerate them. The *Tool and Manufacturing Engineers Handbook*, an SME publication, at Chapter 7, page 14 says that a broach finishing teeth may be "back stepped" to compensate for elastic springback of the workpiece. While the term "back step" is not explained or defined, an accompanying illustration makes it clear that what is meant by "back stepping" the finish teeth is that, while they are still in a straight line, the slope of the line is less. That is, the tool rise for the finishing teeth is still uniform or linear, but is a smaller uniform rise per tooth. In effect, two of the basic tooth patterns described above are placed end to end, but the basic pattern, tooth to successive tooth, is not altered.

SUMMARY OF THE INVENTION

The subject invention provides a fundamentally different and new cutting tooth configuration, which arose out of a rigorous study of the turn broaching process and the conventional tool rise design described above. Using computer simulations and actual machining tests it was discovered that, because of workpiece deflection, the first tooth in the linear cutting tooth pattern described took an actual depth of cut that was less than it should theoretically take. This in turn caused each successive tool to see an even greater net thickness of workpiece material than that which it was theoretically designed to remove, which continued in an ever worsening pattern. Consequently, each successive cutting tooth was forced into a continually growing layer of workpiece material, because of the deflection caused, accumulating depth of cut deficit. Thus, successive cutting teeth saw an increasing cutting force, an unstable process that caused excessive wear, especially of the later teeth in the series.

The invention provides a new, non linear cutting tooth pattern, one that controls the variations in the cutting force so as to extend the useful tool life. To control the variations in cutting force, the deflection that each cutting tooth causes on the workpiece is taken into account in determining what the increment of advance for each subsequent tooth should be, rather than just evenly dividing the total thickness of material to be removed evenly over each tooth. First, the general deflection response of the rotating workpiece when a rigidly supported tooth is advanced into its surface in a predetermined direction relative to the axis of the workpiece is determined. This may be done experimentally or analytically.

Next, taking into account the strength of the tool, and the deflection response of the workpiece, an initial increment of advance for the first tooth is set. The first increment of advance is set significantly higher than the equivalent linear, but not so high as to overstress or break the tooth. Two factors account for the greater first increment. First, the first tooth is set higher simply because doing so accounts for the previously not accounted for upward deflection of the workpiece. The tooth has to be higher just to get the desired net depth of cut. Secondly, and more fundamentally, the first tooth is set higher so as to take a deliberately and significantly greater actual, net depth of cut than the equivalent linear tool rise would. While this creates a larger cutting force on the first tooth, cutting force being a function of actual depth of cut, it allows better use of the later teeth.

Next, taking into account the deflection caused by the first tooth, an increment of advance for the second tooth is chosen that is less than the increment of advance for the first tooth, but still greater than the constant rise of the equivalent linear tool rise. The increment of advance for the second tooth is decreased sufficiently that it will not experience an increase in cutting force, compared to the first tooth. So, while the second tooth will take an adequate cut, greater than the second tooth of a equivalent linear pattern would, its lesser increment of advance takes into account the deficit in cut caused by the deflection of the first tooth. This pattern of continually decreasing increments of advance is continued for the remaining teeth in the series, with the same object of keeping the cutting force at least substantially constant over all the cutting teeth. Still, every tooth in the series is higher in absolute terms than the corresponding tooth in an equivalent linear tool rise, except for the final tooth is set at the same finish point as the final tooth in the equivalent linear pattern would be.

Having eliminated the increasing trend in cutting force by redesigning the tool, decreased tooth wear, increased tool life, and better surface quality are achieved, with no other change in operating parameters. The early teeth are no longer underworked at the expense of overworking the later teeth. While the workpiece is initially, and deliberately, shocked more by the significantly higher earlier tooth, it is then allowed to settle down in stable fashion. Furthermore, in the specific example disclosed, the tooth to tooth increments of advance are sufficiently reduced relative to one another that the tooth to tooth cutting force trend is actually a decreasing one, at least early on in the life of the broach. Then, over time, as the earlier teeth in the series inevitably wear and take less depth of cut than they originally did, so that the later teeth must take more, the force profile can flatten out, increasing tool life even further. To aid the tool designer, a regression formula is provided with a variable percentage decrease in the tooth to tooth relative increment of advance. This allows an initial cutting force profile that is flat, or decreasing, to any desired degree, to be easily chosen.

It is, therefore, a general object of the invention to provide a method for designing a turn broach that has a series of cutting teeth arranged in a new configuration that will reduce tooth wear and extend tool life.

It is another object of the invention to provide such a configuration in which the incremental advance of each successive tooth is functionally related to the workpiece deflection caused by each prior tooth in the series, thereby controlling the deflection caused, unstable variations in cutting force on the cutting teeth and decreasing the consequent wear.

It is still another object of the invention to provide such a new configuration in which the incremental advance of each successive tooth is decreased relative to the incremental advance of each prior tooth.

It is yet another object of the invention to provide a method of machining a cylindrical workpiece in which the cutting teeth are designed to have successively decreasing increments of advance that are sufficiently reduced that the cutting forces of the workpiece of the teeth are weighted initially toward the early teeth in the series, so that, with subsequent wear of the earlier teeth, the cutting forces may even out and shift toward the later teeth in the series, increasing tool life even more.

DESCRIPTION OF THE PREFERRED EMBODIMENT

These and other objects and features of the invention will appear from the following written description and from the accompanying drawings, in which.

Figure 1:
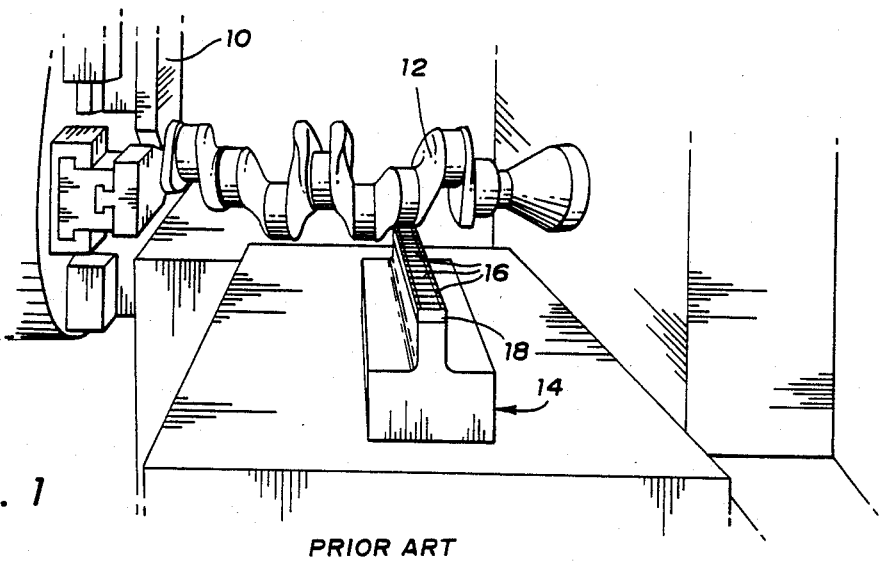
FIG. 1 is a view of a typical turn broaching station.
Figure 2:
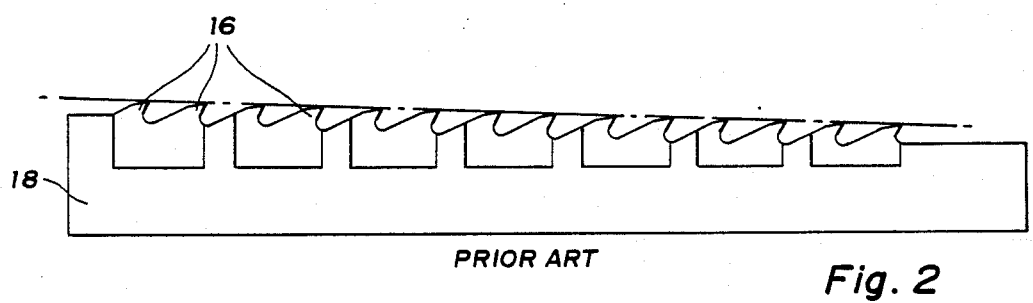
FIG. 2 shows the basic linear tool rise pattern of a conventional turn broach.
Figure 3:
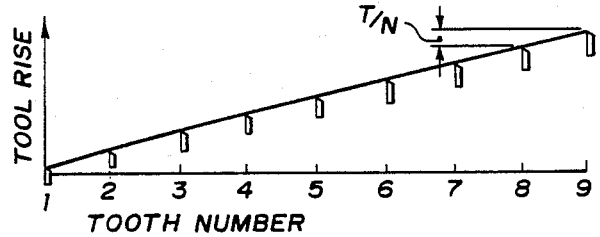
Figure 5:
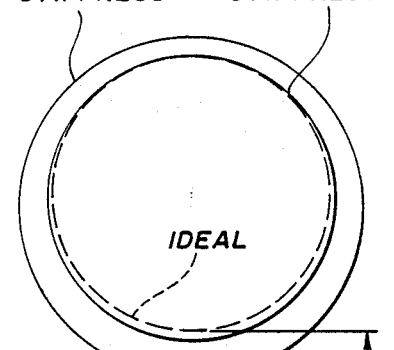
Figure 4:
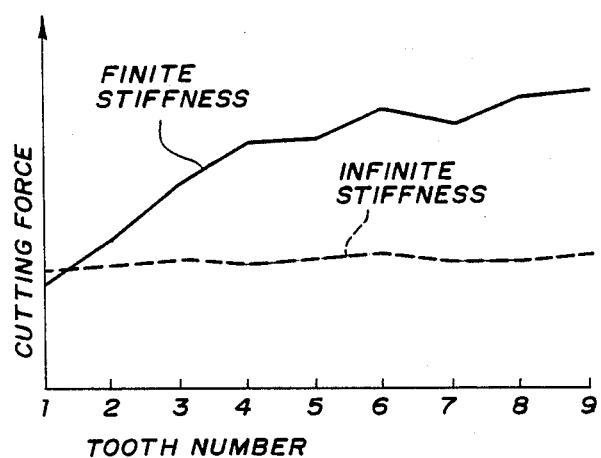
Figure 10:
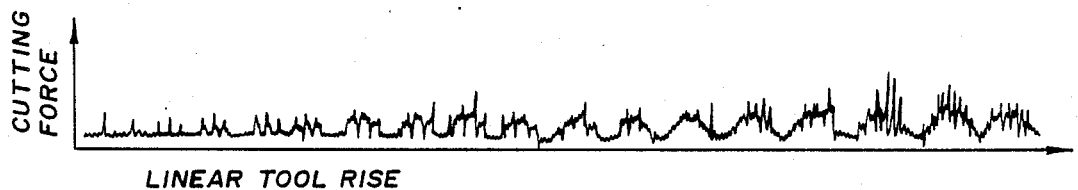
Figure 11:
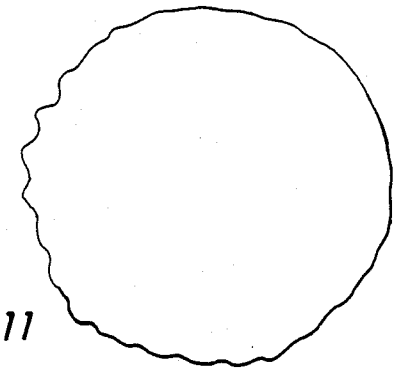
Figure 12:
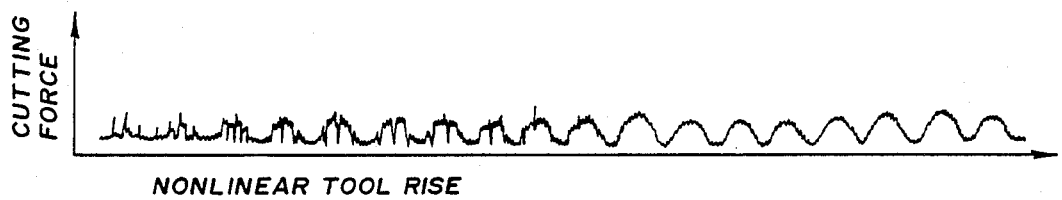
Figure 13:
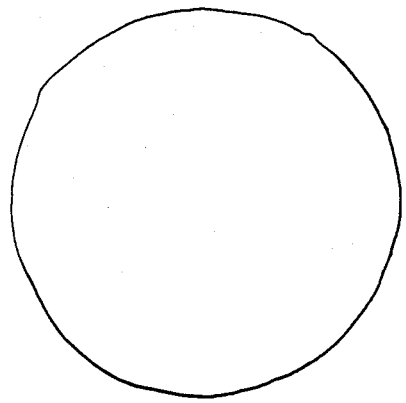
Figure 14:
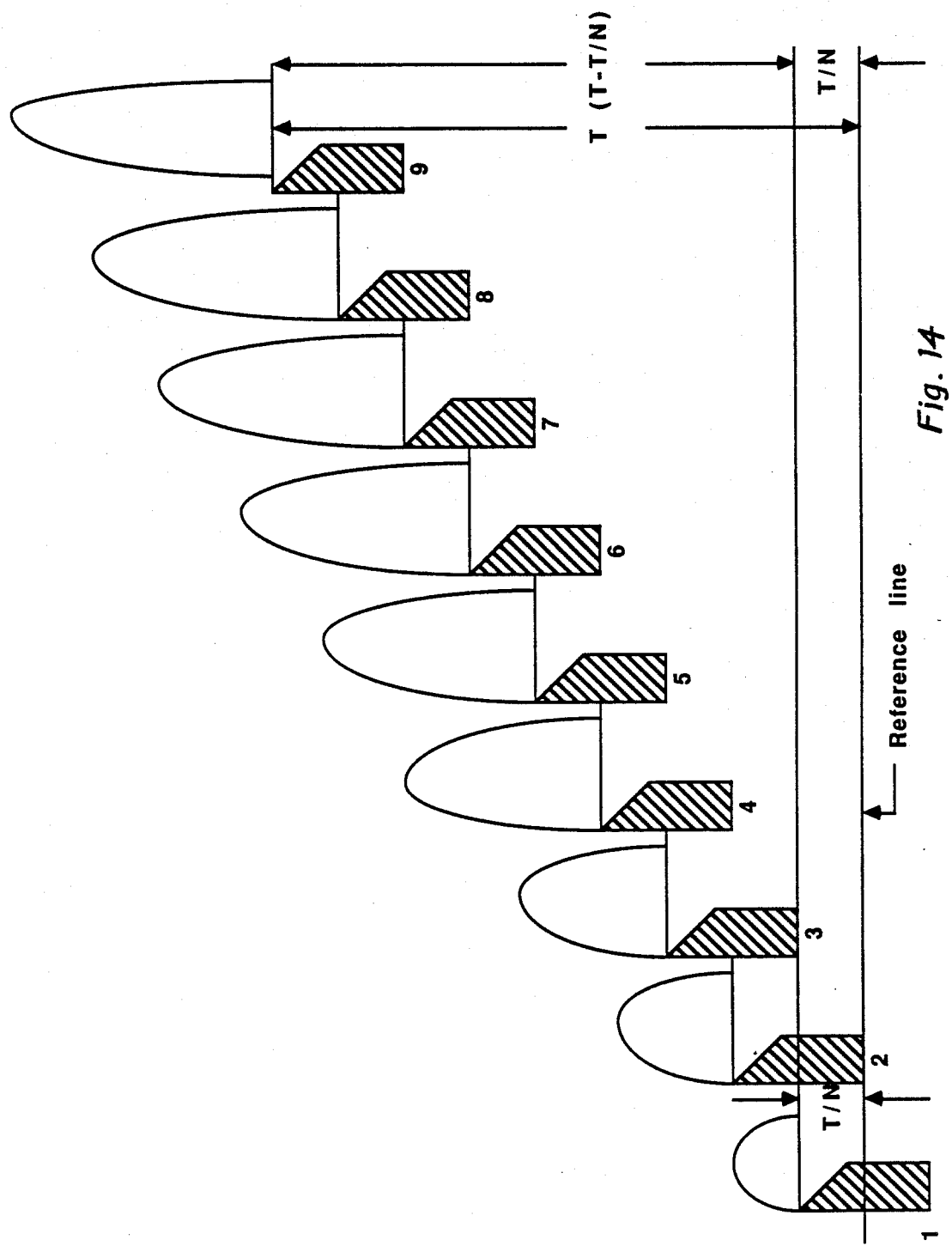
Figure 15:
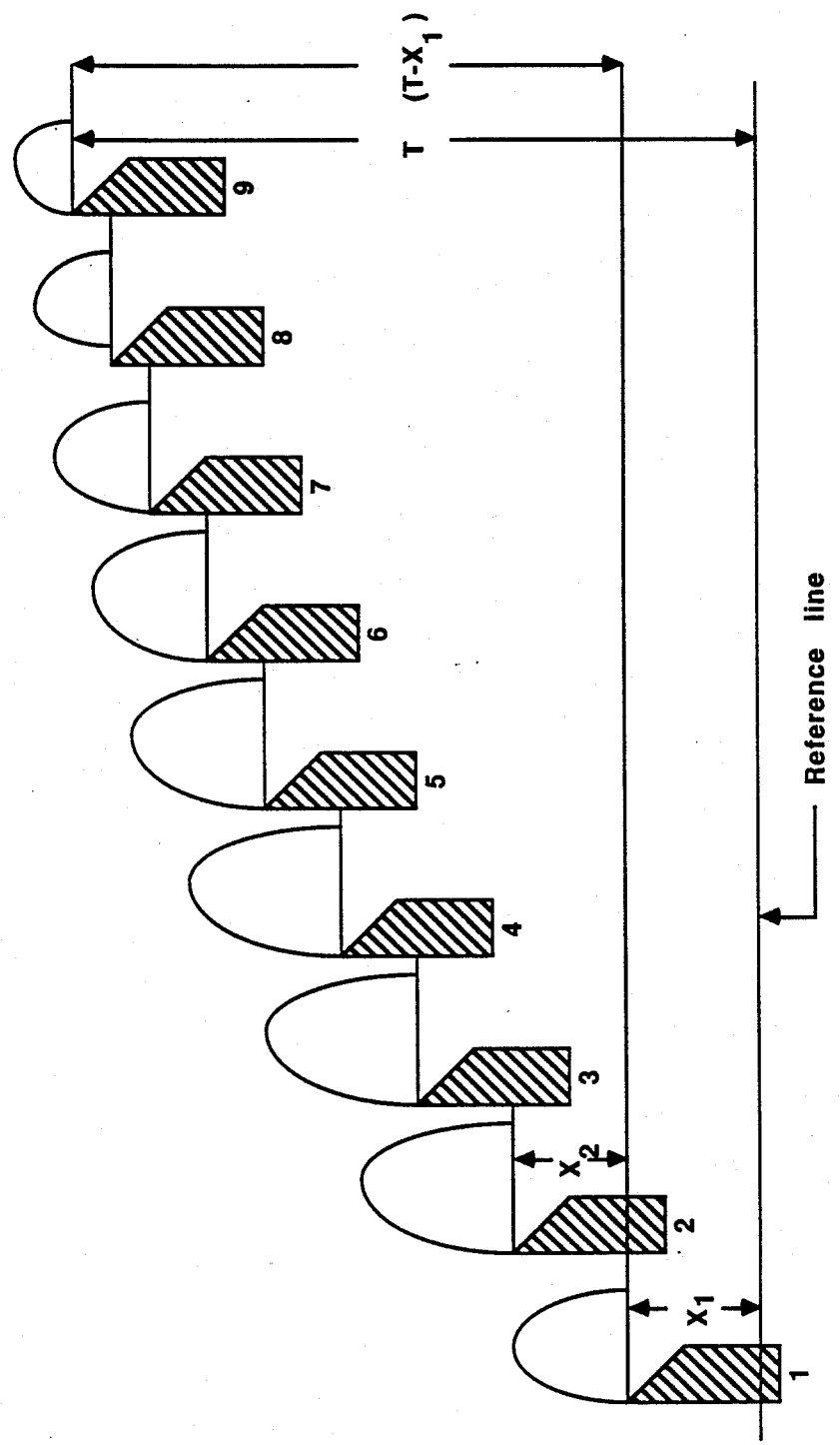
Figure 16:
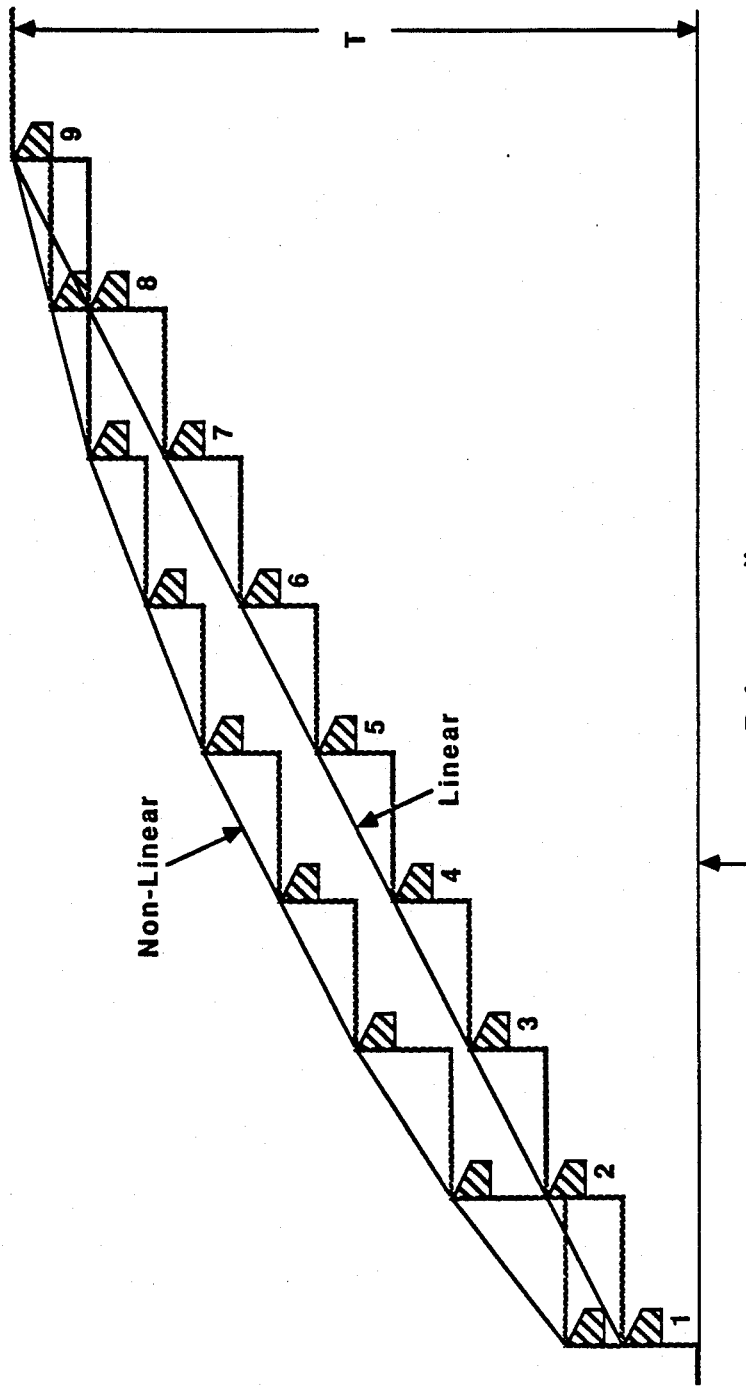

FIGS. 3 through 5 the results in terms of predicted cutting force and surface finish for a linear tool rise pattern;

FIG. 6 is a perspective view of the rougher section of a turn broach incorporating the novel tool rise pattern of the invention;

FIGS. 7 through 9 correspond to FIGS. 3 through 5, but for the configuration of the invention;

FIGS. 10 and 11 show actual results in terms of cutting force and surface finish for a linear tool rise pattern;

FIGS. 12 and 13 show actual results in terms of cutting force and surface finish for the invention;

FIG. 14 is a schematic view of the workpiece deflections caused by the a linear tool rise broach of FIG. 3;

FIG. 15 is a schematic view of the workpiece deflections caused by the non linear tool rise of FIG. 7;

FIG. 16 is a superimposition of the corners of the cutting teeth of the invention and the equivalent linear tool rise, comparing the corresponding increments of advance of the teeth.

Referring first to FIGS. 3 and 14, the advantages of the invention are best explained by initially describing the problems with the conventional linear tool rise pattern described above that had not been previously understood. The conventional example shown has nine cutting teeth 16, although any number could be used. The total thickness of excess workpiece material to be machined down may be mathematically described most simply in terms of the initial radius of the workpiece minus the final radius. However, since diameters are far easier to measure than radii, it is more practical to quantify it as the initial diameter, $D_i$, minus the final diameter, $D_f$, divided by two, which may be conveniently represented as the single quantity T. Then, the incremental advance or rise of every cutting tooth 16 in a series of N teeth is simply Di minus Df, divided by 2N, or T/N, N being nine. The initial increment of advance for the first tooth 16 is obviously not measured relative to a prior tooth, there being no prior tooth. Instead its increment of advance is just its height measured above a reference line that perpendicular to the axis of the workpiece and tangent to its uncut surface. The reference line is shown in FIG. 14, but not 3.

Referring next to FIGS. 4 and 5, a computer simulation was done to predict the cutting force profile of the workpiece on the cutting teeth and to predict the surface profile of the finished surface, in this case a main journal of a crankshaft casting like 12 described above. This was done assuming two different workpiece conditions, one of infinite stiffness, and one of finite stiffness. The ideal or nominal surface profile, of course, is the perfect circle, shown by the dotted line in FIG. 5. However, the geometric nature of the turn broaching process, with the broach being continually advanced into the surface of the workpiece as it rotates, prevents the perfect circle from being achieved. If a workpiece condition of infinite stiffness is assumed, a predicted surface profile very close to the perfect circle results, which is illustrated and so labeled in FIG. 5. Furthermore, the cutting force profile is essentially flat and constant over each tooth 16, as seen in the dotted line in FIG. 4. Actually, the cutting force seen by any given cutting tooth 16 varies throughout the time of the cut. Therefore, it will be understood that the force profile really shows the maximum cutting force on each cutting tooth 16 during the time that it is in the cut, which is the force that causes the worst wear. Assuming a finite stiffness for the workpiece instead, which better approximates reality, a quite different result is predicted. A maximum cutting force that rises rather steeply for each successive tooth, and a surface profile that is more out of round, are predicted, see FIG. 5.

Referring next to FIGS. 4 and 14, the increase in cutting force per successive tooth 16 shown in FIG. 4 for the finite stiffness case results from a mechanism that had not been well recognized. As shown in FIG. 14, the first cutting tooth in the series induces a deflection of the workpiece away from the tooth, causing it to take an actual, net depth of cut less than the theoretical, geometric depth of cut that it would have taken had the workpiece been inflexible. The instantaneous cutting force of the workpiece on the tooth is a function of the geometric depth of cut, or, stated differently, a function of how great a thickness of material the cutting tooth initially "sees" and is forced into as the broach is moved toward the workpiece. If the prior tooth has deflected the part, and has therefore actually cut less than the ideal, geometric depth of cut, the subsequent tooth will experience an instantaneous cutting force that is greater as a consequence of the deflection induced cut deficit of the prior tooth. This process continues and worsens over the remaining teeth as the cut deficits continually add up. Each subsequent tooth sees progressively more workpiece material than the prior tooth, experiences a higher cutting force as a consequence, deflects the part even more, and leaves an even greater excess of material to be faced by the next tooth, which causes an even greater cutting force, and so on. The pattern of increasing deflections is graphically represented in FIG. 14. This pattern of increasing deflections, increasing cut deficits, and increasing cutting force all cooperate to create an unstable system that is especially hard on the final teeth in the broach. In effect, the conventional linear tool rise pattern is logical only for the case of nearly infinite workpiece stiffness, an assumption which the inventors discovered to be not well founded.

Referring next to FIG. 6, a new tool rise pattern is embodied in the turn broach of the invention, specifically in the rougher section 20 that is used to machine a crankshaft main journal. Rougher 20 includes a solid base or body 22 to which is mounted a series of indexable inserts, which provide the cutting teeth 24. As will be well known to those skilled in the art, indexable inserts are removably mounted and disposable, generally having eight identical cutting corners. They are turned or "indexed" periodically until all eight cutting corners are used up, whereupon the insert is replaced. Therefore, the most telling measure of productivity for any particular configuration is the number of parts that can be machined before the insert must be replaced. In the embodiment disclosed here, the cutting teeth 24 comprise three sets of nine teeth, a first set of side teeth 24A, a central set of teeth 24B, and a second set of side teeth 24C. These three sets of teeth 24A, B, and C are in a straight line as one looks down and are evenly spaced, which is referred to as the pitch, but are staggered relative to one another. The two sets of side teeth 24A and 24C cut the sides of the journal, while the central teeth 24B cut the center. The total length of the teeth 24 is 495 mm, and the lateral spacing or width between the two sets of side tools 24A and 24C is 27.05 mm, which is the same as the width of the surface that they machine. While the three sets of teeth 24 A, B, and C are in a straight line as viewed looking down, they are not in a straight line as viewed from the side. The actual, specific configuration of the tool, and the specific parameters and results of its operation will be first described. Then, the general theory and method of design and operation will be described so as to permit one skilled in the art to design similar turn broaches to machine other cylindrical workpieces of finite stiffness.

Referring next to FIGS. 7 and 15, each of the three sets of cutting teeth 24A, 24B and 24C are independently arranged in the novel configuration of the invention. According to the invention, the cutting teeth 24 do not have a uniform, constant incremental advance or tool rise. Instead, while each tooth is higher than the prior tooth, the amount of the incremental advance or tool rise of any given tooth is functionally related to, and less than, the incremental advance of the previous tooth. For the computer simulation that was done, the incremental advance or rise of each tooth was calculated on the basis of a regression formula $$X_i = [(X_{i-1})(1-(A/100))],$$

where "i" stands for the second through the ninth tooth, there being no tooth prior to the first. "A" is the desired percentage of successive decrease. Clearly, the starting point must be the incremental advance of the first tooth, $X_1$. The formula used to calculate $X_1$ is $$X_1 = T(A/100)/[1-(1-(A/100)\exp N]$$

where N is the total number of teeth. Once $X_1$ is so calculated, the increments of advance of the subsequent cutting teeth may be simply calculated from the regression formula. The value for "A" may be any desired percentage decrease, which may be chosen on the basis of experiment or other factors. If a computer simulation is initially used, as here, then any number of different A values may be relatively easily tried. Using this formula, for any N, adding all the increments together gives T, the total thickness of workpiece material to be removed, just as with a linear tool rise. Even though the same total thickness of workpiece material is removed by the same total number of teeth as with the linear tool rise, the results are significantly improved in terms of wear and productivity, as will be next described.

Referring next to FIGS. 8 and 9, in the preferred embodiment disclosed, the value of A was set at 15%, and a predicted cutting force profile and journal surface profile were computer generated. As seen in FIG. 8, the reaction or cutting force profile predicted, beyond being flattened out, actually decreases over the whole series of cutting teeth 24. If A were chosen to be less than 15%, that profile would be flatter, closer to a constant. That in itself would be an improvement over the steeply increasing force profile of the linear design, as it would better distribute the cutting forces and consequent wear over the whole series of teeth. However, the specific embodiment, with its decreasing cutting force trend, presents an additional advantage. With use, the early cutting teeth in the series will inevitably wear somewhat, decreasing the net thickness of workpiece material that they remove, and thereby increasing the net thickness of material seen by the latter teeth 24. The cutting force and consequent wear on the latter, having started out low, teeth can increase without ill effect. In effect, the force profile can flatten out and shift to the later teeth over time, and tool life can be extended even more. As seen in FIG. 9, the computer simulation also predicted a significantly smaller out of roundness condition in the machined workpiece for a rougher 20 with the non linear design of the invention.

Referring next to FIGS. 10 through 13, the rougher section 20 described above was tested under production conditions. A great advantage of the invention is that, since it is incorporated just in the novel configuration or arrangement of basically old, commercially available parts, it may be quickly and economically applied in production. For the tests run here, the prior production parameters were maintained, so that any increase in productivity would be readily apparent, and clearly the result only of the novel configuration of the cutting teeth. The computer predictions for the invention were confirmed, and productivity and tool life were very significantly improved. The workpiece was the cast iron crankshaft casting 12 noted above, and the surface machined was a main bearing journal, which had a total thickness of approximately 3.35 mm of excess material to be removed. The speed with which the crankshaft casting 12 was rotated as it was fed over the rougher 20 was 700 RPM, and the feed rate of the broach was 2.03 m/min. For the conventional rougher, as seen in FIGS. 10 and 11, the cutting force had significant spiking and instability, and the surface profile reflected that fact. While the finisher section of the broach could and did still bring the final finished surface within specification, there was more resultant wear on the entire broach than was desirable. In quantitative terms, approximately 250 castings could be machined before the inserts that provide the cutting teeth 24 had to be changed. With the rougher 20 of the invention, however, as seen in FIGS. 12 and 13, a significantly more stable cutting force profile and a significantly better surface profile were obtained. This translated into less wear and tool breakage in the rougher 20, and less wear on the finisher as it brought the surface within specification. Parts per insert change increased very significantly, to approximately 850. It was also noted that the rougher 20 of the invention ran far more quietly. The above described tool and operating parameters works well for the specific workpiece shown. However, one skilled in the art may wish to design a different, but similar tool, for other situations. To do so, it helps to have a general understanding of the theory of operation and basic design principles involved in making and using the invention.

Both the linear, conventional broach, and the specific formula for the invention just described, make use the quantity T in calculating the increment of advance for all of the teeth. The general method used in the invention to determine the optimum tooth pattern, however, considered most broadly, does not just blindly arrange the teeth on the basis only of the total thickness T of material to be removed. Instead, the method of the invention takes into account other, previously ignored factors, including the stiffness or flexibility of the workpiece, the deflections of the workpiece caused by the teeth, the accumulated deficits in depth of cut caused by the deflections, the maximum cuts that can be taken by the early teeth without overstressing them, and even the degree of wear of the early teeth with time, and how that affects the cutting force profile. In the linear tool rise, these factors were irrelevant. Taking these new factors into account in designing and using the broach results in a more stable, longer life tool, as will be next described.

The first step, once one has realized why deflections should be compensated for in designing the broach, is to determine the general deflection response of the particular cylindrical workpiece involved, when rotated at a desired speed about its axis, to having a rigidly supported tooth advanced into its surface in a particular direction relative to the axis of the workpiece. Most often, the direction desired will be a straight line perpendicular to the axis of the part, with the broach teeth being pushed across and tangent to the lower surface of the workpiece, but it could be at a different angle. The method of determining the general deflection response of the workpiece may be rigorously analytical, if desired. For example, a computer simulation of the crankshaft 12 was done as part of the design process of the particular rougher 20 described above. First, empirical measurements of the crankshaft 12 stiffness were made at the main journal locations where machining was to be done. That stiffness data was then worked into computer program model of the machining process. While a comprehensive computer simulation is helpful in allowing easy variation of parameters for designing different tools for different workpieces on paper, a much simpler practical, trial and error type process may be followed for any specific workpiece. Load deflection tests at the area to be machined may be done on the workpiece as it is supported between its ends. Then, an educated guess as to the degree of deflection may be made. Or, as the workpiece is rotated about its axis at the desired speed, a single, rigidly supported cutting tooth may be fed into the surface to be machined in the desired direction, and at various increments of advance. Measuring the actual depths of cut will give a good idea of the general degree of deflection in the particular workpiece caused by different increments of tooth advance.

Next, the designer would determine an initial increment of advance for the first tooth in the series, that is, its height above the reference line. A fundamental and important difference compared to the linear tool rise is that it is not set at just T divided by N. Instead, working from the new realization that the linear tool rise underworks the first tooth, an aggressive increment of advance is set for the first tooth. Ideally, the first tooth would take the largest cut possible without overstressing it. At the very least, the first tooth will be set to take a larger than conventional cut, that is, larger than just T/N. Again, trial and error may be used to try different first increments to see what the first tooth can take. The general deflection analysis may be a factor in calculating the first tooth height, as well, as the designer will now take into account that the actual depth of cut for the fist tooth will not be just its height above the reference line, because it, too, will deflect the workpiece. But, most fundamentally, the first tooth height will be based on considerations of tool strength, and the desire to work the first tooth more aggressively. No general formula, like the conventional T/N, can or need be provided for determining the first tooth increment of advance. What is provided is the fundamentally new teaching of more aggressively working the first tooth. It should also be understood that these first two steps would not necessarily be carried out in that order. That is, one could first determine how much bite the first tooth could successfully take, and then determine the general deflection response of the workpiece. However, as a practical matter, it would probably be easier to determine a general deflection response first.

The next step, taking into account the first tooth height and the general deflection response of the workpiece, is to determine an increment of advance for the second tooth. Again, no specific formula need be provided. The fundamental consideration in determining the second increment of advance, and all subsequent ones, is to keep the cutting force seen by the second tooth, and all subsequent teeth, at least substantially the same as that seen by the first tooth. In other words, the increasing cutting force trend found in the linear tool rise is to be avoided. This primary consideration, coupled with the realization that the first tooth deflected the workpiece and took less than its geometric depth of cut, compels an increment of advance for the second tooth that is less than the first. No all encompassing formula for how much less need be given, but how much less can be roughly calculated from the deflection determined to have been caused by the first tooth. That is, the second increment of advance should be less than the first by at least the amount of the first tooth deflection, so as to avoid the accumulated deficit in cut that caused the increasing cutting force in the case of the linear tool rise. It would also be possible, empirically, to directly measure the cutting force on the first and second teeth, and reduce the increment of advance for the second tooth just enough to keep the force constant.

This process of increment reductions would be carried out successively until a final tooth was reached that was at, or very close to, a height T above the reference line, which would be the final tooth by definition. A series of cutting teeth so configured will inevitably be in the bowed up, curved, non-linear pattern described in detail above, even though they will not necessarily have been arrayed according to any rigorous mathematical formula. Conversely, any broach with its teeth so arranged will inevitably have been designed according to such principles, and would make sense only in the context of the teachings of the invention to very each tooth so as to achieve the desired force trend. Finally, to machine the workpiece, the teeth would be so arranged on a rigid base, and the base would be driven along the desired path into the surface of the rotating workpiece with the first tooth set at its determined height above the reference line, just as with a conventional broach. The only difference would be the improved results. Having avoided the increasing force trend, and increasing deflection trend of the linear tool rise, the designer can have a fair amount of confidence that the machined surface, upon reaching the final tooth, will be more "in round" than for a linear tool rise with the same number of teeth, and the finisher can then take over. Tooth wear will be consequently reduced, and tool life extended.

If the tool designer has a certain amount of flexibility on the possible length of the broach, so that the number of teeth is not a limiting factor, then the process of "just enough" increment reduction could be carried out without limit until one tooth ends up at, or at least very near, to the point T above the reference line, which will be the final tooth in the series. Should the designer be constrained as to broach length, and thereby limited as to the number of teeth over which T can be distributed, then he may well have to decrease the successive increments less in order to get up to T within the available number of teeth. However, it is difficult to imagine broach length and tooth number being constrained by any factors other than economic ones. And, should the designer be relatively unconstrained as to the number of teeth, than he can decrease successive increments by more than "just enough," thereby taking relatively more teeth to get to a final tooth that is at a height T above the reference line, but potentially gaining the greater tool life advantage of the initially decreasing cutting force trend described above, and described in more detail next.

Referring to FIG. 16, an enlarged schematic representation of the non linear tool rise pattern is shown in comparison to the corresponding linear tool rise case. The various increments of the teeth and the the reference line are shown. The teeth are configured using the specific formula described above, with $A = 15\%$. All the teeth in the invention are higher, in the absolute sense, for the invention, except for the last, and the increments of advance are higher for the first few teeth, but smaller for the last few, compared to the linear case. Understanding the general design principles involved, one skilled in the art will see that the specific formula described above is just one possible embodiment. The regression formula is a particularly practical and advantageous means of creating the non linear, curved pattern of the invention. It is basically as easy to apply as the linear, T/N formula, as it is based also on T and N, as well as on A. For any given number of teeth and a given T, the last tooth will end up at T, since T is a factor in the formula. It so happened, that for the particular crankshaft 12 involved, and for the particular strength and number of teeth 24 involved, that the first increment $X_1$ in the regression formula did not overstress the first tooth. That might not be the case for a smaller number of teeth, but in that case, the number of teeth would probably be too few to work with any pattern, and it is not likely that a designer would be so limited as to the number of teeth. The formula is also convenient, as noted above, in that A may be easily increased or decreased.

Referring next to FIGS. 8 and 15, the advantage noted for the particular embodiment described above may be more fully understood. It was noted that if the A percentage is set to be larger than the general "just enough" amount, then the decreasing force profile of FIG. 8 can be achieved. While that also means it would take more teeth to get the final tooth up to the level T, the number of teeth should not generally be a problem, as noted. The physical mechanism behind the decreasing force profile, as seen in FIG. 15 is that the deflections of the workpiece tooth to tooth have a generally decreasing, or stable, trend, as opposed to the ever growing, unstable trend of the linear case. This decreasing tooth to tooth deflection shows up for every tooth but the second. Rather than an accumulation of cut deficit tooth to tooth, there is a progressive decrease. In other words, compared to the linear tool rise, the workpiece is initially kicked up more sharply, but then allowed to settle down gradually. In the linear tool rise, the part is deflected up gently at first, but then more so with every tooth, overstressing the last teeth.

The invention may be embodied in tools other than the rougher 20 disclosed. The same basic tooth configuration could be applied to an arcuate broach, as well. The teeth in a corresponding arcuate broach would be arranged with radii that had incremental advances derived from the same formula. The same pattern could be applied to other broach sections as well, although the advantages are most apparent in the rougher. The broadest concept of the invention is to functionally relate the incremental rise of each tooth in the series to the workpiece deflection that has been caused by the prior tooth, so as to control the reaction force variations caused by those deflections and decrease wear. A cutting tool designed with that fundamental concept in mind need not necessarily entail, in all cases, a tool rise in which the incremental advance decreased from tooth to tooth, or over all teeth. For example, it might be desired to machine a part that had layers of varying hardnesses. An example would be a part with a case hardened outer layer. There, the initial teeth would have smaller increments of rise. The later teeth would have greater increments of advance tailored to the softer workpiece layers that they would see. Therefore, it will be understood that the invention is not intended to be limited to the exact embodiment disclosed.

The physical embodiments of the invention in which an exclusive property or privilege is claimed are defined as follows:

1. A method of designing a tool for machining a layer of material of thickness T from the surface of a cylindrical elongated workpiece of finite stiffness that is rotated about its axis, said tool being of the type in which a series of cutting teeth are rigidly supported on a tool base that is moved in a predetermined direction such that said teeth advance into said workpiece surface, comprising the steps of, determining the deflection response of said workpiece, as it is rotated about its axis, to the advancement of a single rigidly supported cutting tooth into its surface in said predetermined direction, determining an initial increment by which the first tooth may be advanced into the surface of said rotating workpiece so as to take a first, greatest depth of cut while still creating a cutting force sufficiently small to be withstood by said first cutting tooth, using said determined deflection response and first increment to determine a second, smaller increment of advance that a second cutting tooth may be given relative to said first tooth so as to take a second depth of cut that creates a cutting force substantially equal to said first tooth, using said determined deflection response to calculate subsequent, continually smaller increments of advance that may be given to each subsequent cutting tooth so that each takes a depth of cut that creates a substantially equal and constant cutting force, and, providing said tool base with a rigidly supported series of cutting teeth located at said determined increments of advance, whereby, as said tool base is moved in said predetermined direction, said series of teeth will remove a total thickness T of material from said workpiece while maintaining a substantially uniform cutting force on said cutting teeth.

2. A method of machining a layer of material of thickness T from the surface of a cylindrical elongated workpiece of finite stiffness, comprising the steps of, determining the deflection response of said workpiece, as it is rotated about its axis, to the advancement of a single rigidly supported cutting tooth into its surface in a predetermined direction relative to said axis, determining an initial increment by which a first rigidly supported cutting tooth may be advanced into the surface of said rotating workpiece so as to take a first, greatest depth of cut while still creating a cutting force sufficiently small to be withstood by said first cutting tooth, using said determined deflection response and first increment to determine a second, smaller increment of advance that a second cutting tooth may be given relative to said first tooth which is sufficiently smaller so as to take a second depth of cut that creates a cutting force less than said first tooth, using said determined deflection response to calculate subsequent, continually smaller increments of advance that may be given to each subsequent cutting tooth which are each sufficiently smaller such that each tooth takes a depth of cut that creates a continually smaller cutting force, providing a tool base with a rigidly supported series of cutting teeth located so as to have said predetermined relative increments of advance, with a sufficient number of teeth such that the final tooth is at a height above the uncut surface of said workpiece substantially equal to T, and, moving said tool base in said predetermined direction such that said first tooth advances into said workpiece surface by said initial increment of advance, thereby eventually removing a total thickness T of material from said workpiece, while creating an initially decreasing cutting force profile on said cutting teeth, so that, with wear of the early teeth, the cutting force profile may flatten and shift, thereby further increasing tooth life.

* * * * *